(12) United States Patent
Kato

(10) Patent No.: US 7,458,716 B2
(45) Date of Patent: Dec. 2, 2008

(54) PARTICULATE MIXER HAVING PADDLES OF DIFFERENT LENGTHS

(75) Inventor: Fumio Kato, Aichi (JP)

(73) Assignee: Tsukasa Co., Ltd., Aichi (JP)

( * ) Notice: Subject to any disclaimer, the term of this patent is extended or adjusted under 35 U.S.C. 154(b) by 0 days.

(21) Appl. No.: 11/775,389

(22) Filed: Jul. 10, 2007

(65) Prior Publication Data
US 2008/0159068 A1    Jul. 3, 2008

(30) Foreign Application Priority Data
Dec. 27, 2006    (JP) ............................. 2006-352077

(51) Int. Cl.
*B01F 7/04*    (2006.01)
(52) U.S. Cl. .................................. 366/329.2
(58) Field of Classification Search ............. 366/329.1, 366/329.2, 325.92, 224
See application file for complete search history.

(56) References Cited

U.S. PATENT DOCUMENTS

| | | | | |
|---|---|---|---|---|
| 721,890 A | * | 3/1903 | Henius | 366/149 |
| 2,138,240 A | * | 11/1938 | Kobusch | 366/329.2 |
| 4,205,920 A | * | 6/1980 | Vigano | 366/67 |
| 4,310,124 A | * | 1/1982 | Schwing et al. | 366/329.1 |
| 4,390,285 A | * | 6/1983 | Durr et al. | 366/170.3 |
| 4,650,343 A | * | 3/1987 | Doom et al. | 366/329.2 |
| 2008/0159068 A1 | * | 7/2008 | Kato | |

FOREIGN PATENT DOCUMENTS

JP    2003320341 A    * 11/2003

* cited by examiner

*Primary Examiner*—Charles E Cooley
(74) *Attorney, Agent, or Firm*—Rodman & Rodman (57) ABSTRACT

The particulate mixer is part of a blender that includes a cylindrical drum with a particulate mixing chamber. A rotating shaft is arranged in a horizontal direction in the particulate mixing chamber. Four arms project in a radial direction from the rotating shaft and include four paddles with respective stirring blades spaced from each other in an axial direction on the rotating shaft. The drum has a cylindrical center portion and side portions that communicate with the cylindrical center portion. Each of the side portions has a lower face and a vertical face. The drum is in the form of a truncated cone with the rotating shaft as its axis. The stirring blades have a driving end face and a driven end face with slopes corresponding to the slopes of the lower face of the side portions.

5 Claims, 9 Drawing Sheets

PARTICULATE MIXER HAVING PADDLES OF DIFFERENT LENGTHS

CROSS-REFERENCE TO RELATED APPLICATIONS

This application claims priority to Japanese Patent Application No. 2006-352077 filed Dec. 27, 2006, the contents of which are incorporated herein by reference.

1. Technical Field

The present invention relates to a particulate mixer, and more specifically to a particulate mixer using paddles to mix and blend the particulate.

2. Background Art

The applicant of the present invention has proposed the single paddle structure and the double paddle structure of a particulate mixer as disclosed in Patent Documents 1 and 2. As written in these cited Patent Documents 1 and 2, the particulate mixer has a cylindrical drum and plural paddles arranged along the axial direction of a rotating shaft. Each of the plural paddles has a paddle arm extended in the radial direction of the rotating shaft and a stirring blade attached to the paddle arm. In the double paddle structure, a stirring blade located inside of the paddle arm in the radial direction for stirring the particulate is arranged coaxially with an inducing blade located outside of the paddle arm in the radial direction for stirring the particulate and introducing the particulate to an outlet.

Patent Document 1: Japanese Patent Laid-Open Gazette No. 2002-336670

Patent Document 2: Japanese Patent Laid-Open Gazette No. 2002-338056

SUMMARY OF THE INVENTION

In these prior art structures, the drum is cylindrical in shape, and the plural paddles have the stirring blades of the same shape. This leads to some disadvantages: a relatively monotonous mixing flow in a limited mixing flow area, a relatively long mixing time and significant damages on tea leaves or similar particulate, and poor applicability for mixing particulate having a significant specific gravity variation or a significant particle size variation. There are clearances between the free ends of the respective stirring blades and the inner face of the drum on both ends of the drum. This dead space causes accumulation of the particulate by means of the gravity. This leads to other disadvantages: residue and pollutant in the bottom corners on both sides of the drum; water accumulation and difficulty in cleaning and water washing in the bottom corners on both sides of the drum; and a relatively long discharge time.

In order to eliminate these disadvantages, a particulate mixer of the invention includes: a main body that has a cylindrical drum and a particulate mixing chamber; a rotating shaft that is arranged in a horizontal direction in the particulate mixing chamber and is supported on the main body in a rotatable manner; and plural paddles that are arranged along an axial direction of the rotating shaft. Each of the plural paddles has a paddle arm extended in a radial direction of the rotating shaft and a stirring blade attached to the paddle arm. The drum has a center portion and a side portion connecting with the center portion. The side portion has a lower face having a radius decreasing from inside to outside of the axial direction. The paddle located in the center portion has a greater length in the radial direction than the paddle located in the side portion.

In one aspect of the particulate mixer of the invention, the stirring blade of the paddle located in the side portion has an end face having a slope corresponding to a slope of the lower face.

The particulate mixer of the invention has the following advantageous characteristics:

(1) The drum has the truncated cone-shaped inclined faces on its both ends to allow the gravitational breakdown of the particulate. The inner paddles and the outer paddles have different whole lengths in the radial direction. This gives the different paddle circumferential velocities to form a three-dimensional chaotic mixing flow of the particulate over the whole area of the particulate mixer and thereby widen the mixing flow area.

(2) The particulate mixer requires a significantly short mixing time of the particulate, for example, as short as 2 to 5 minutes (even 1 to 3 minutes for some particulates);

(3) The particulate mixer has extremely little damages on tea leaves or similar particulate;

(4) The normal rotation and the reverse rotation of the rotating shaft give different particulate mixing flows. The particulate mixer is thus applicable to a wide range of particulates, for example, for mixing particulate having a significant specific gravity variation or a significant particle size variation;

(5) The particulate mixer gives little residue and less pollutant and is easily cleaned and washed with water; and (6) The particulate mixer shortens the discharge time of the particulate.

BEST MODES OF CARRYING OUT THE INVENTION

A particulate mixer 1 is described below in detail as one embodiment of the invention with reference to the accompanied drawings of FIGS. 1 through 9. The particulate mixer 1 has a blender 4 that includes a cylindrical drum 2 and a particulate mixing chamber 3, a rotating shaft 5 that is arranged in a horizontal direction in the particulate mixing chamber 3 and is supported on the blender 4 in a rotatable manner, four arms 6a through 6d that are protruded in the radial direction of the rotating shaft 5, and 1st paddle 8a through 4th paddle 8d that have stirring blades 7a through 7d respectively set on the arms 6a through 6d. The four paddles, that is, the 1st paddle 8a through the 4th paddle 8d, are arranged in an axial direction X of the rotating shaft 5. The drum 2 has a cylindrical center portion 20 and side portions 21 connecting with both ends of the center portion 20. Each of the side portions 21 has a lower face 22 and a vertical face 23. The drum 2 is formed in a truncated cone with the rotating shaft 5 as its axis. The stirring blades 7a and 7d of the 1st paddle 8a and the 4th paddle 8d located along the lower faces 22 respectively have a driving end face 7e and a driven end face 7f with slopes corresponding to the slopes of the lower faces 22. The upper portion of the lower face 22 may be rounded. The detailed structure is explained below.

The normal rotation of the rotating shaft 5 rotates the particulate inward (toward the center). The 1st paddle 8a through the 4th paddle 8d are attached to the rotating shaft 5 to allow such normal rotation.

Figure 1:
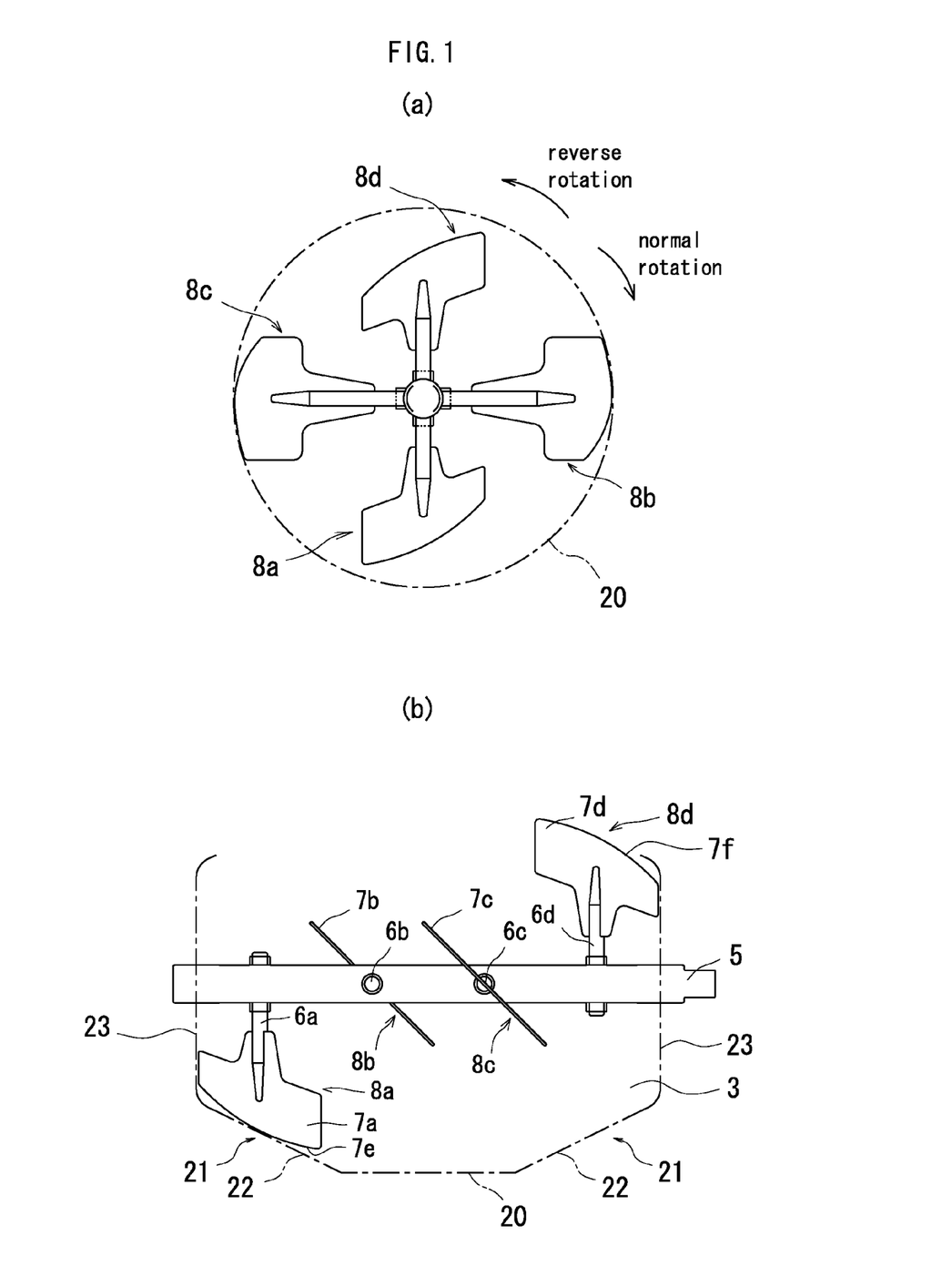
FIG. 1(a) is a right side view of paddles attached to a rotating shaft of a particulate mixer in one embodiment of the invention.
FIG. 1(b) is a front view showing the paddles.
Figure 2:
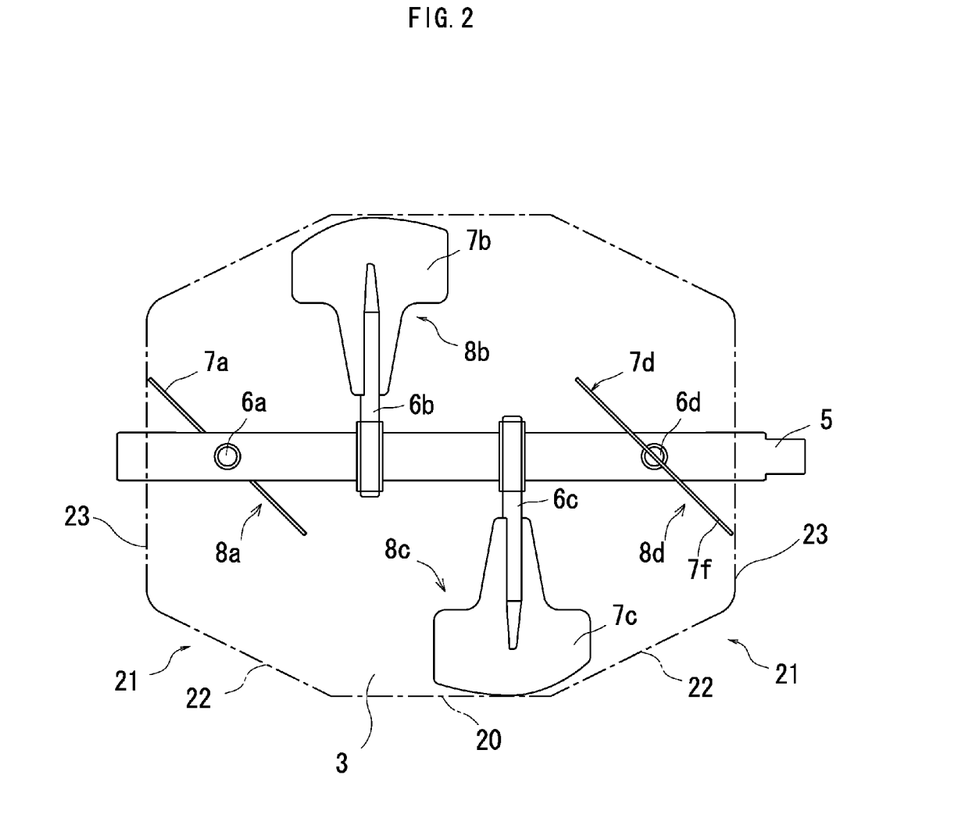
FIG. 2 is a plan view showing the paddles.
Figure 3:
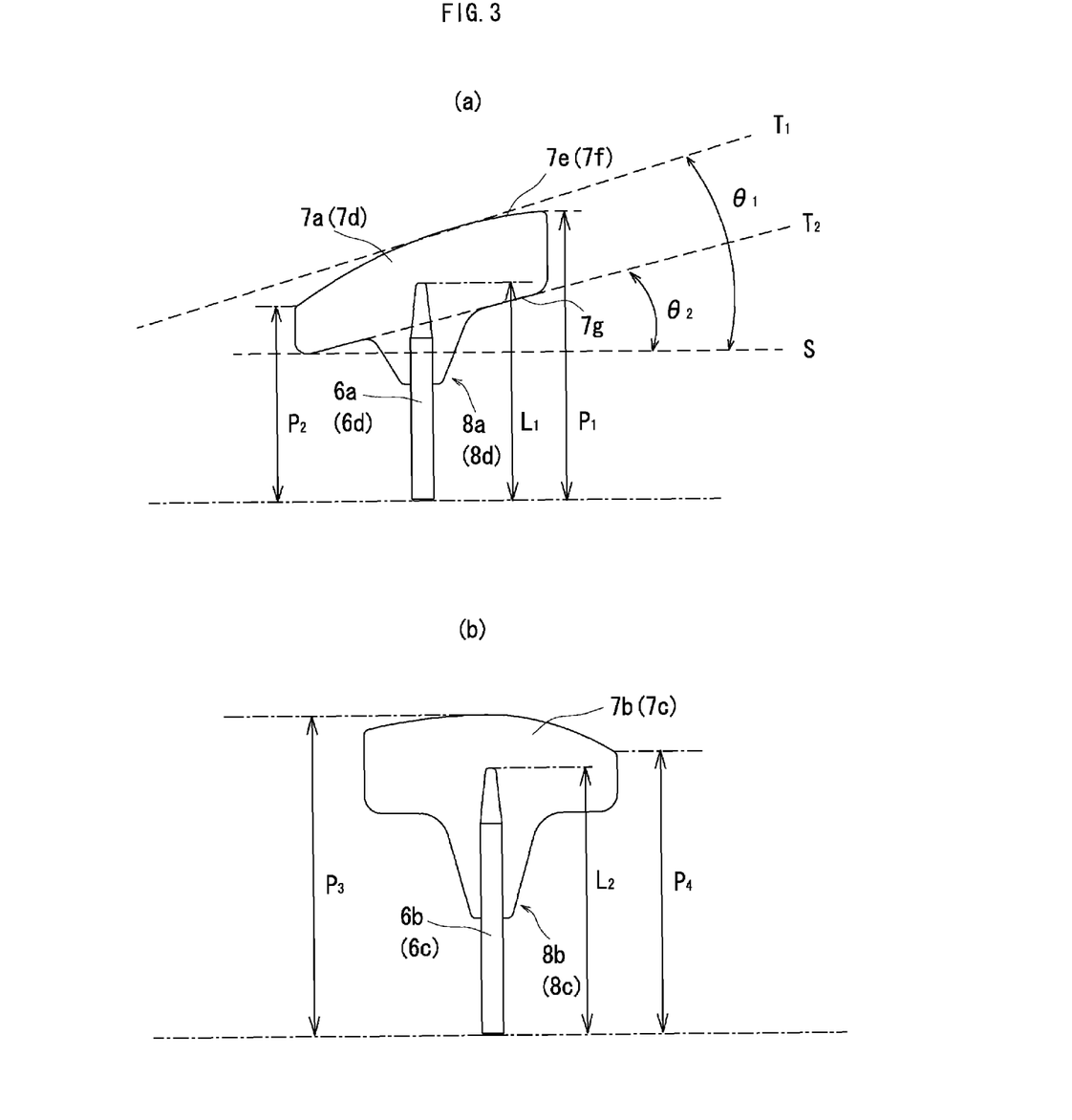
FIG. 3(a) is a front view showing $1^{st}$ and $4^{th}$ paddles.
FIG. 3(b) is a front view showing $2^{nd}$ and $3^{rd}$ paddles.
Figure 4:
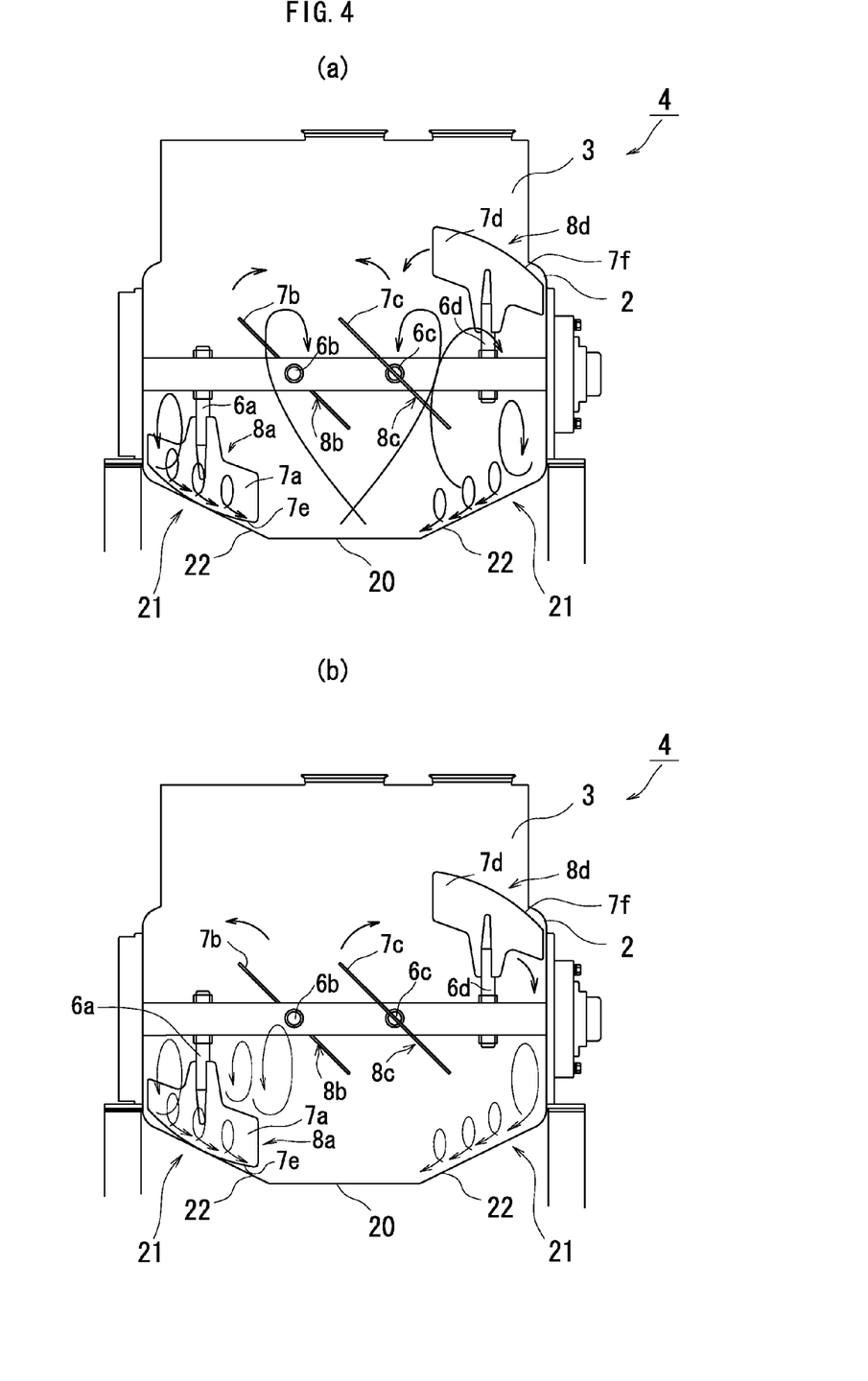
FIG. 4(a) is a front view showing a particulate flow direction in a lower side portion of the particulate mixer in a normal rotating condition.
FIG. 4(b) is a front view showing a particulate flow direction in the lower side portion of the particulate mixer in a reverse rotating condition.
Figure 5:
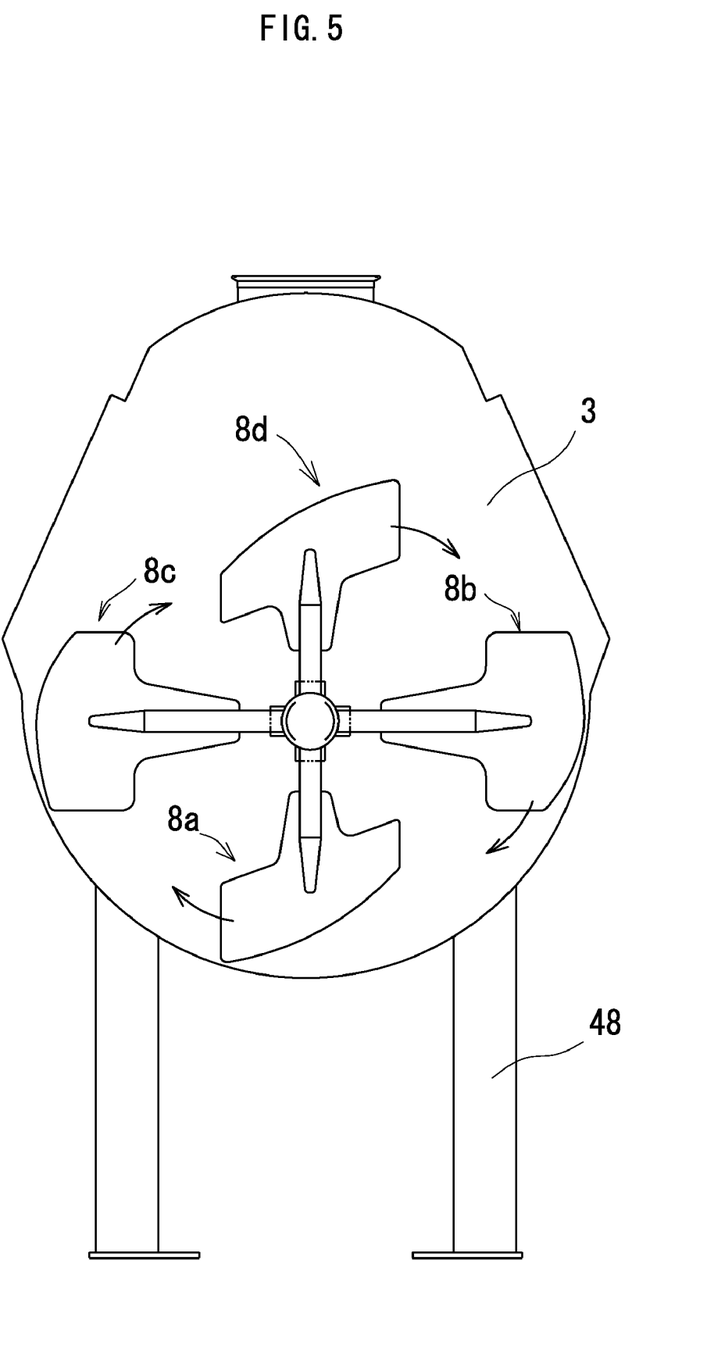
FIG. 5 is a right side view showing a flow direction of a flow mixture in the normal rotating condition of the particulate mixer.
Figure 6:
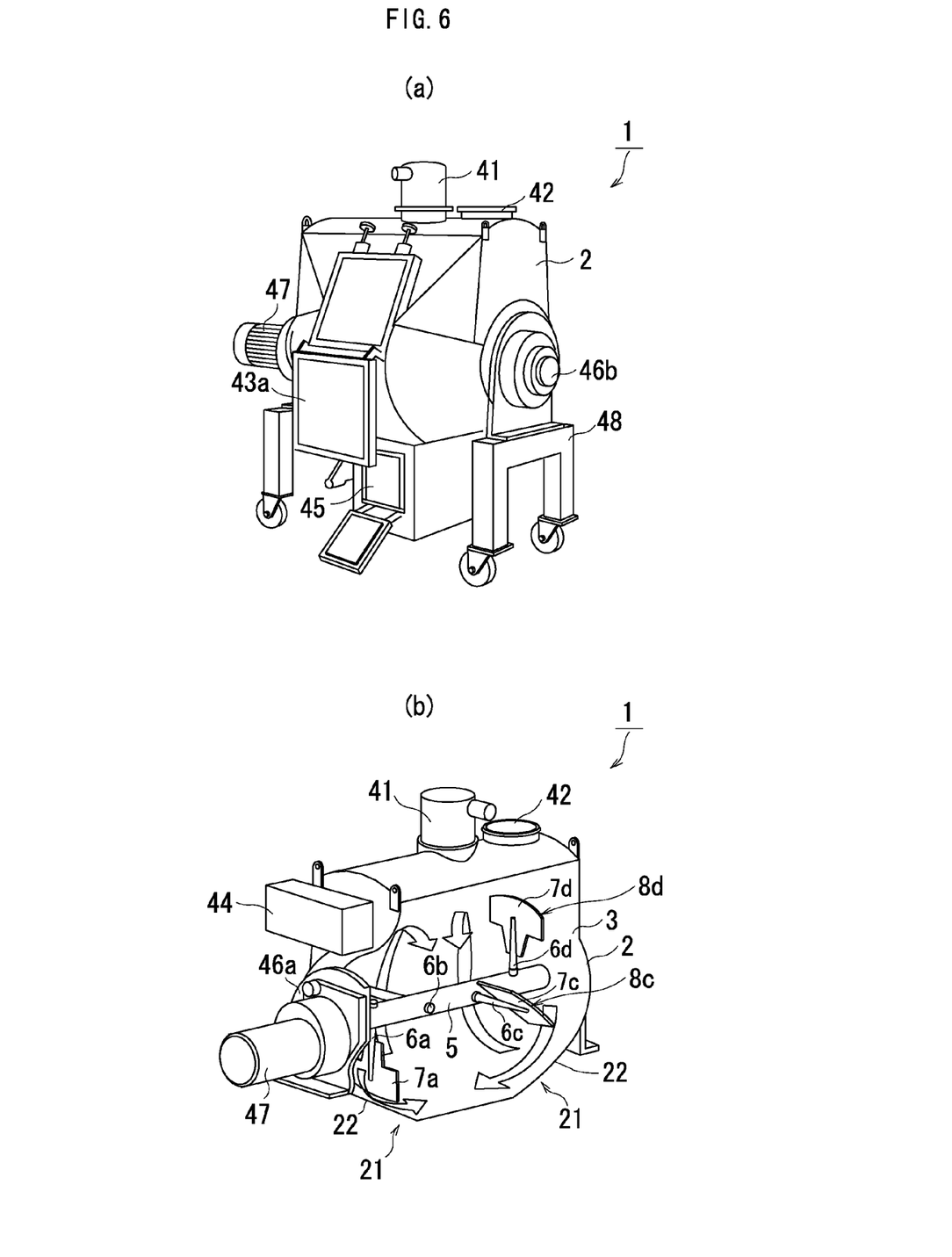
FIG. 6(a) is a photographic view showing a real model of the particulate mixer.
FIG. 6(b) is a perspective view showing a mixing state.

The 1st paddle 8a through the 4th paddle 8d are arranged at preset intervals or adequate intervals in the axial direction of the rotating shaft 5 along the outer circumferential face of the rotating shaft 5 to be protruded in the radial direction of the rotating shaft 5 (that is, in the direction perpendicular to the axial direction of the rotating shaft 5). The arms 6a through 6d are arranged perpendicular to the rotating shaft 5 to pass through corresponding holes (not shown) formed in the rotating shaft 5 and to be fixed to the rotating shaft 5. Each of the stirring blades 7a through 7d is a thin plate of hammer head shape and has a substantially fixed width and a narrower base than a free end. The stirring blades 7a through 7d are fixed to the ends of the corresponding arms 6a through 6d. The arms 6a through 6d are extended toward the center positions of the respective stirring blades 7a through 7d. The 1st paddle 8a is attached to a driving end of the rotating shaft 5. The 2nd paddle 8b is attached to the rotating shaft 5 at an angle of 90 degrees from the 1st paddle 8a in a clockwise direction. The 3rd paddle 8c is attached to the rotating shaft 5 at an angle of 180 degrees from the 2nd paddle 8b in the clockwise direction. The 4th paddle 8d is attached to a driven end of the rotating shaft 5 at an angle of 90 degrees from the 3rd paddle 8c in a counterclockwise direction and at an angle of 180 degrees from the 1st paddle 8a. The number and the shape of the paddles may be determined adequately according to the type of the object particulate and the volume of the drum 2. The stirring blades 7a through 7d are inclined to have a predetermined angle (45 degrees in the illustrated example) relative to the axial direction.

As shown in the front view of FIG. 1(b), the 1st paddle 8a and the 4th paddle 8d are attached aslope to the respective ends of the rotating shaft 5. The 2nd paddle 8b and the 3rd paddle 8c located on the central area of the rotating shaft 5 are inclined to have a predetermined angle (45 degrees in the illustrated example) relative to the axial direction of the rotating shaft 5.

As shown in FIG. 3(a), the 1st paddle 8a (the 4th paddle 8d) has an angle of $\theta_1$ (20 degrees in the illustrated example) between a tangent $T_1$ of an outer (upper) end face 7e (7f) and a horizontal baseline S and an angle of $\theta_2$ (13 degrees in the illustrated example) between a tangent $T_2$ of an inner end face 7g and the horizontal baseline S, where $\theta_1 > \theta_2$. The length between the axial center of the rotating shaft 5 and the end of the stirring blade 7a (7d) varies in a range of a minimum value $P_2$ to a maximum value $P_1$. The arm 6a (6d) has a length $L_1$.

As shown in FIG. 3(b), each of the 2nd paddle 8b and the 3rd paddle 8c has a substantially symmetrical shape with a slightly greater slope on one side of its outer end face. In the 2nd paddle 8b (the 3rd paddle 8c), the length between the axial center of the rotating shaft 5 and the end of the stirring blade 7b (7c) varies in a range of a minimum value $P_4$ to a maximum value $P_3$. The arm 6b (6c) has a length $L_2$.

According to the comparison between the 1st paddle 8a (the 4th paddle 8d) and the 2nd paddle 8b (the 3rd paddle 8c), the arm length $L_2$ is greater than the arm length $L_1$, and the average of the whole lengths $P_1$ and $P_2$ in the radial direction is relatively smaller than the average of the whole lengths $P_3$ and $P_4$ in the radial direction. The difference in whole length in the radial direction results in the difference in circumferential velocity of the circumferential end. Namely the circumferential end of the stirring blade 7b (7c) having the greater whole length in the radial direction has the higher circumferential velocity, while the circumferential end of the stirring blade 7a (7d) having the smaller whole length in the radial direction has the lower circumferential velocity. The different whole lengths in the radial direction produce the unique chaotic mixing flow. These two different structures of the paddles are characteristic of this embodiment.

The directions of the main faces of the respective stirring blades 7a through 7d are set to move the particulate toward the center of the drum 2 in the normal rotation and enhance the stirring efficiency of the particulate. In the structure of this embodiment, the stirring blades 7a through 7d are rotated only in one direction and are not reversely rotated.

Figure 7:
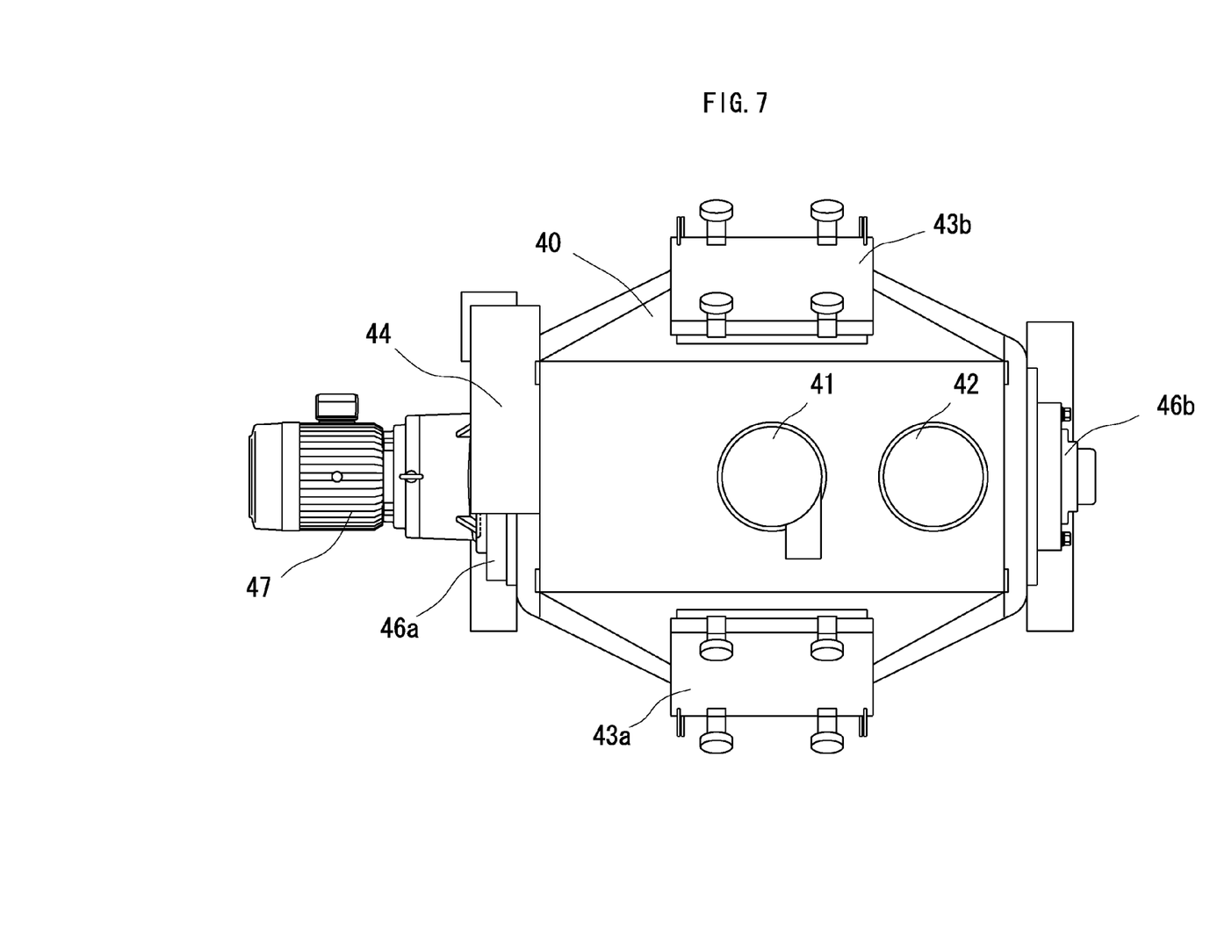
FIG. 7 is an appearance plan view of the particulate mixer.
Figure 8:
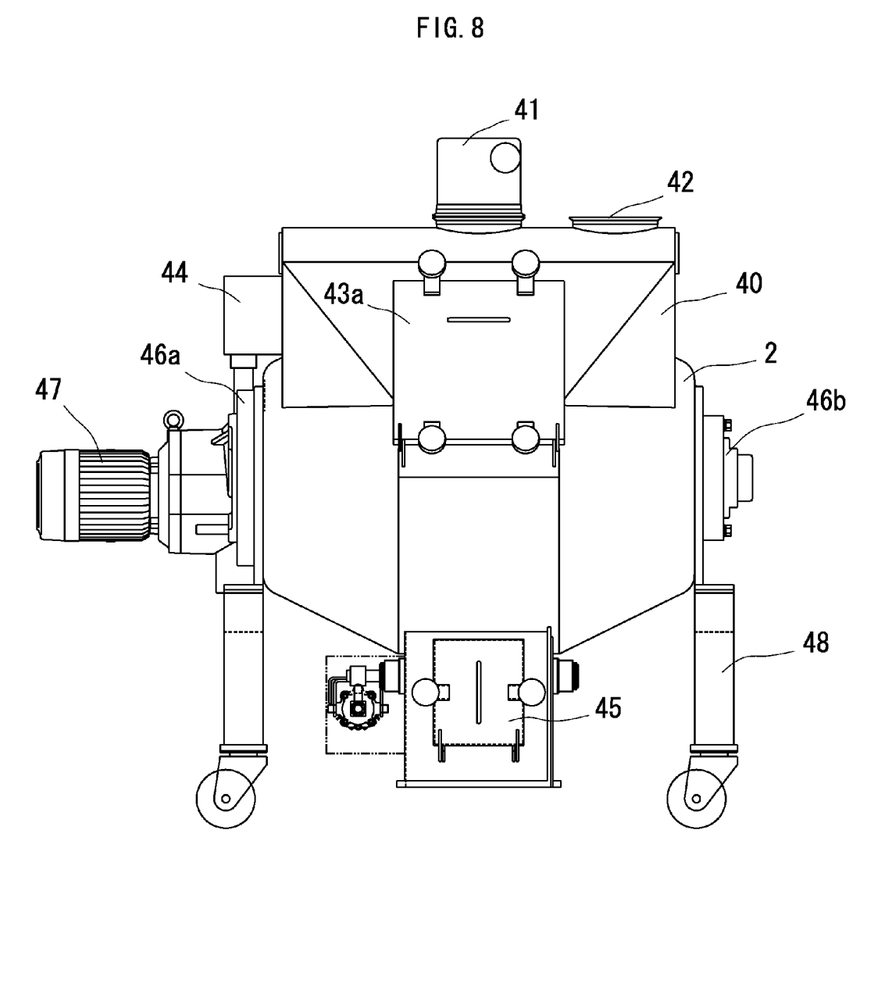
FIG. 8 is an appearance front view of the particulate mixer.
Figure 9:
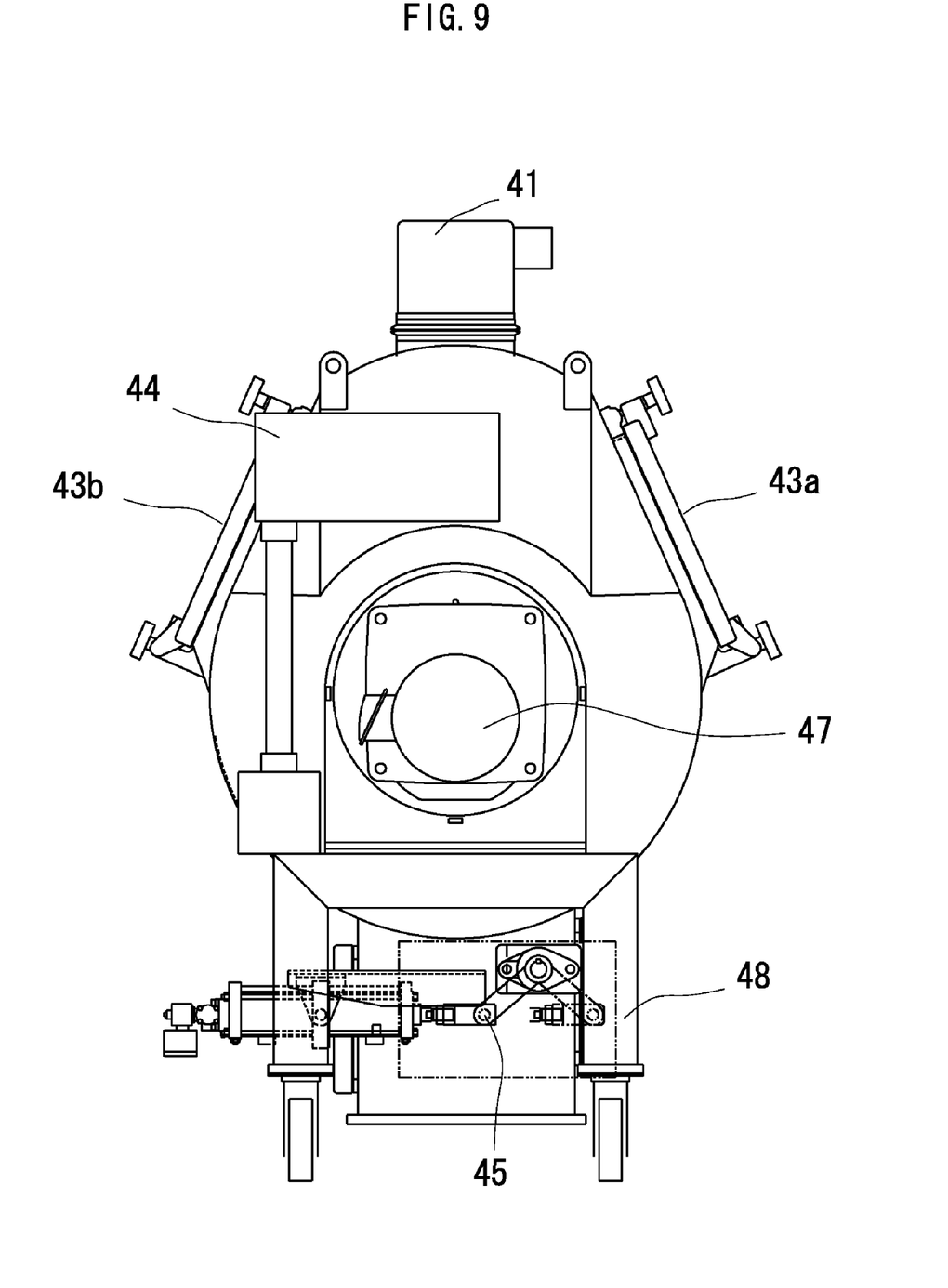
FIG. 9 is an appearance left side view of the particulate mixer.

The structure of the particulate mixer 1 is further explained with reference to FIGS. 7 through 9. An upper housing 40 is placed above the drum 2. The upper housing 40 has a first inlet 41 and a second inlet 42 formed on its top face, an inspection door 43a located on its front face, another inspection door 43b located on its back face, and a controller 44 on its left side face. The drum 2 is formed continuously with the upper housing 40. A discharge gate 45 is formed on the bottom face of the drum 2 and is freely opened and closed by the controller 44. The drum 2 has a driving bearing unit 46a and a driven bearing unit 46b that are respectively arranged in the center areas on the left side face and on the right side face to support the rotating shaft 5 in the horizontal direction in a freely rotatable manner. A motor 47 is attached to the outside of the driving bearing unit 46a in the lateral direction to drive and rotate the rotating shaft 5. The drum 2 is supported by a stand 48.

The description regards the characteristic operations of the particulate mixer 1 of the embodiment. The detailed operations other than the characteristic operations are to be referred to the cited Patent Document 1. The particulate mixer 1 is used to mix and blend various particulates in batch, for example, food material particulate in a bread factory or in a noodle factory. The material particulate is fed through the first inlet 41 or the second inlet 42 into the particulate mixer 1 installed in the factory. An air supply source of a pneumatic conveyor line is connected to a rotary valve (not shown) attached to the discharge gate 45. The particulate mixer 1 is connected to a commercial power source.

The material particulate fed through the first inlet 41 or the second inlet 42 falls down to the particulate mixing chamber 3. In response to the operator's press of a paddle switch (not shown), the controller 44 outputs a driving signal to the motor 47 to start the motor 47. The rotating shaft 5 linked with the motor 47 via the driving bearing unit 46a starts rotation to rotate the 1st paddle 8a through the 4th paddle 8d inside the particulate mixing chamber 3 and stir the material particulate. The stirring blades 7a through 7d scrape out the heap of the material particulate and fluidize the material particulate inside the particulate mixing chamber 3. The repeated stirring operations fluidize the fed material particulate to every corner of the particulate mixing chamber 3. This increases the effective mixing space. In the normal rotation of the rotating shaft 5, the stirring blades 7a through 7d are rotated to move the material particulate toward the center. The material particulate has the complicated three-dimensional chaotic motions in the particulate mixing chamber 3. This is ascribed to the inclined lower faces 22 and to the different circumferential velocities of the circumferential ends, which are caused by the difference between the whole lengths $P_1$ and $P_2$ of the stirring blades 7a and 7d and the whole lengths $P_3$ and $P_4$ of the stirring blades 7b and 7c in the radial direction. The material particulate above the driving end face 7e and the driven end face 7f is smashed by the gravity to move toward the center. The gravitational breakdown of the material particulate occurs, irrespective of the position of the stirring blade 7a or the stirring blade 7d. There is accordingly little heap of the material particulate on the driving end face 7e or on the driven end face 7f. Namely the material particulate is not accumulated in any part of the particulate mixing chamber 3. The material particulate is thus easily fluidized and is homogeneously mixed within a short time.

In response to the operator's ON operation of a server switch (not shown) after completion of mixing, the controller 44 outputs a driving signal to the discharge gate 45 to open the discharge gate 45 and outputs a driving signal to the rotary valve (not shown) to start the conveyance. In response to the operator's subsequent ON operation of a blower switch (not shown), the controller 44 outputs a driving signal to the air supply source (not shown) to start the pneumatic conveyance. The material particulate on the bottom of the particulate mixing chamber 3 is then flowed out of the open discharge gate 45 and is pneumatically conveyed to a downstream particulate processing unit. The material particulate fed into the particulate mixing chamber 3 is stirred by the $1^{st}$ paddle 8a through the $4^{th}$ paddle 8d and is moved from the outer side to the inner side along the inner wall of the particulate mixing chamber 3 in the normal rotation of the rotating shaft 5. The inclined lower faces 22 cause the diagonally inward gravitational breakdown of the material particulate and the inward flow of the material particulate. This significantly enhances the discharge efficiency.

In the normal rotation of the rotating shaft 5, the material particulate is stirred, mixed, and discharged. The rotating shaft 5 may be reversely rotated (see FIGS. 4(a) and 4(b)), instead of or in addition to the normal rotation. In the latter case, the rotating shaft 5 may be rotated reversely for stirring and mixing the material particulate and rotated normally for discharging the mixed material particulate.

The particulate mixer 1 of the embodiment has the following effects:

(1) The gravitational breakdown of the material particulate along the inclined lower faces 22 formed on both ends of the drum 2 and the different circumferential velocities of the paddles 8a through 8d due to the difference between the whole lengths of the $1^{st}$ paddle 8a and the $4^{th}$ paddle 8d and the whole lengths of the $2^{nd}$ paddle 8b and the $3^{rd}$ paddle 8c in the radial direction enable the three-dimensional chaotic mixing flow of the particulate to be formed over the whole area of the particulate mixer 1. This effectively widens the mixing flow area;

(2) The particulate mixer 1 requires a significantly short mixing time of the particulate, for example, as short as 2 to 5 minutes (or even 1 to 3 minutes for some particulates);

(3) The particulate mixer 1 has extremely little damages on tea leaves or similar material particulate;

(4) The normal rotation and the reverse rotation of the rotating shaft 5 give different particulate mixing flows. The particulate mixer 1 is thus applicable to a wide range of particulates, for example, for mixing particulate having a significant specific gravity variation or a significant particle size variation;

(5) The inclined lower faces 22 give little residue of the particulate and less pollutant and allow the particulate mixer 1 to be easily cleaned and washed with water. The less number of paddles facilitates cleaning and water washing;

(6) The inclined lower faces 22 shorten the discharge time of the particulate; and (7) The $1^{st}$ paddle 8a through the $4^{th}$ paddle 8d are used for both stirring and discharging the particulate. The inclined lower faces 22 are effective for both stirring and discharging the particulate. This enhances the working efficiency.

The embodiment discussed above is to be considered in all aspects as illustrative and not restrictive. There may be many modifications, changes, and alterations without departing from the scope or spirit of the main characteristics of the present invention. These modified arrangements and their equivalencies are included in the scope of the invention.

One example of possible modification is described briefly. The rotating shaft 5 is rotated in only the normal direction in the structure of the embodiment but may be reversely rotated (see FIG. 4(b)). While the particulate is moved inward in the normal rotation of the rotating shaft, the particulate is moved outward in the reverse rotation. In the system of pneumatic supply and conveyance of the particulate, the particulate mixer 1 may communicates with an upstream pneumatic conveyor line, and a filter may be provided to the particulate mixer 1 to separate the particulate from the gas.

What is claimed is:

1. A particulate mixer comprising
   a main body that has a cylindrical drum and a particulate mixing chamber;
   a rotating shaft that is arranged in a horizontal direction in said particulate mixing chamber and is supported on said main body in a rotatable manner; and
   plural paddles that are arranged in spaced relationship along an axial direction of said rotating shaft in said mixing chamber, each said paddle has a paddle arm extended in a radial direction of said rotating shaft and a stirring blade attached to said paddle arm, wherein
   said drum has a center portion with at least two of said stirring blades arranged parallel to each other and oriented at a first acute angle relative to the axial direction of said rotating shaft, and a side portion connecting with said center portion, said side portion having at least one of said stirring blades arranged non-parallel to said two stirring blades in the center portion and said at least one stirring blade in the side portion being oriented at a second acute angle relative to the axial direction of said rotating shaft;
   said side portion has a lower face having a radius decreasing from inside to outside of said axial direction; and
   said paddles located in said center portion have a greater length in the radial direction than said paddle located in said side portion.

2. The particulate mixer of claim 1, wherein said stirring blade of the paddle located in said side portion has an end face having a slope corresponding to a slope of said lower face.

3. The particulate mixer of claim 1, wherein said at least two stirring blades in said center portion define two parallel planes and said at least one stirring blade in said side portion define a plane intersecting said two parallel planes.

4. A particulate mixer comprising a main body that has a cylindrical drum and a particulate mixing chamber;

a rotating shaft that is arranged in a horizontal direction in said particulate mixing chamber and is supported on said main body in a rotatable manner; and plural paddles that are arranged in spaced relationship along an axial direction of said rotating shaft in said mixing chamber, each said paddle has a paddle arm extended in a radial direction of said rotating shaft and a stirring blade attached to said paddle arm, wherein said drum has a center portion and opposite side portions connecting with said center portion, the side portions extending in the horizontal direction, said paddles being provided in said center portion and in said opposite side portions;

each said side portion has a lower face with a radius, the radius of the lower face decreasing as the distance of the lower face from the center portion increases;

said paddles located in said center portion have a greater length in the radial direction than said paddles located in said side portions;

said stirring blades include a first stirring blade oriented at a first acute angle relative to the axial direction of said rotating shaft and a second stirring blade oriented at a second acute angle relative to the axial direction of said rotating shaft;

the paddle arm of said first stirring blade is attached to said rotating shaft at a first position of the rotating shaft;

the paddle arm of said second stirring blade is attached to said rotating shaft at a second position of the rotating shaft;

said first position of the paddle arm of the first stirring blade and said second position of the paddle arm of the second stirring blade are located on opposite sides of the rotating shaft beyond the center of said rotating shaft;

said first acute angle is set so that said first stirring blade, upon rotation of said horizontal shaft in a first direction, can move the particulate inside said drum toward the center of the drum; and said second acute angle is set so that said second stirring blade, upon rotation of said horizontal shaft in said first direction, can also move the particulate inside said drum toward the center of the drum.

5. The particulate mixer of claim 4, wherein said first acute angle is set so that said first stirring blade moves the particulate inside said drum toward an end portion of one opposite side portion via the center of said drum; and said second acute angle is set so that said second stirring blade moves the particulate inside said drum toward an end portion of the other of said side portions via the center of said drum.

* * * * *